(12) United States Patent
Wang et al.

(10) Patent No.: US 10,963,676 B2
(45) Date of Patent: Mar. 30, 2021

(54) IMAGE PROCESSING METHOD AND APPARATUS

(71) Applicant: SAMSUNG ELECTRONICS CO., LTD., Suwon-si (KR)

(72) Inventors: Biao Wang, Beijing (CN); Bing Yu, Beijing (CN); Chang Kyu Choi, Seongnam-si (KR); Deheng Qian, Beijing (CN); Jae-Joon Han, Seoul (KR); Jingtao Xu, Beijing (CN); Yaozu An, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 15/842,190

(22) Filed: Dec. 14, 2017

(65) Prior Publication Data
US 2018/0181796 A1    Jun. 28, 2018

(30) Foreign Application Priority Data

Dec. 23, 2016   (CN) .......................... 201611204669.8
Aug. 3, 2017    (KR) .......................... 10-2017-0098513

(51) Int. Cl.
| | |
|---|---|
| *G06K 9/00* | (2006.01) |
| *G06K 9/36* | (2006.01) |
| *G06T 7/00* | (2017.01) |
| *G06K 9/62* | (2006.01) |
| *G06K 9/03* | (2006.01) |
| *G06K 9/52* | (2006.01) |

(52) U.S. Cl.
CPC ..... *G06K 9/00288* (2013.01); *G06K 9/00228* (2013.01); *G06K 9/036* (2013.01); *G06K 9/36* (2013.01); *G06K 9/52* (2013.01); *G06K 9/627* (2013.01); *G06T 7/0002* (2013.01); *G06T 2207/20081* (2013.01); *G06T 2207/20084* (2013.01); *G06T 2207/30168* (2013.01); *G06T 2207/30201* (2013.01)

(58) Field of Classification Search
CPC .. G06K 9/00288; G06K 9/52; G06K 9/00228; G06K 9/036; G06K 9/627; G06K 9/36; G06T 7/0002; G06T 2207/30201; G06T 2207/20084; G06T 2207/30168; G06T 2207/20081
See application file for complete search history.

(56) References Cited

U.S. PATENT DOCUMENTS

| | | | |
|---|---|---|---|
| 7,603,000 B2 | 10/2009 | Zheng et al. | |
| 8,755,596 B2 * | 6/2014 | Datta ................ | G06K 9/00624 382/160 |
| 8,868,555 B2 | 10/2014 | Erol et al. | |
| 9,152,857 B2 | 10/2015 | Choi et al. | |
| 9,230,343 B2 | 1/2016 | Ozawa | |

(Continued)

FOREIGN PATENT DOCUMENTS

| | | |
|---|---|---|
| CN | 10574758 A | 7/2016 |
| CN | 105740891 A | 7/2016 |

*Primary Examiner* — Phouc Tran
(74) *Attorney, Agent, or Firm* — NSIP Law

(57) ABSTRACT

An image processing apparatus, includes an image classifier configured to determine whether an input image is a low-quality image or a high-quality image; and an image evaluator configured to determine a first predetermined number of clearest images from a plurality of low-quality images determined by the image classifier.

20 Claims, 11 Drawing Sheets

(56) References Cited

U.S. PATENT DOCUMENTS

| | | |
|---|---|---|
| 10,445,881 B2 * | 10/2019 | Spizhevoy ............. G06K 9/036 |
| 2014/0185925 A1 | 7/2014 | Datta et al. |
| 2015/0363634 A1 * | 12/2015 | Yin .................... G06K 9/00221 |
| | | 382/118 |
| 2016/0026900 A1 | 1/2016 | Ando |
| 2017/0294010 A1 * | 10/2017 | Shen ..................... G06T 7/0002 |
| 2018/0144447 A1 * | 5/2018 | Tate ........................ G06T 5/003 |

* cited by examiner

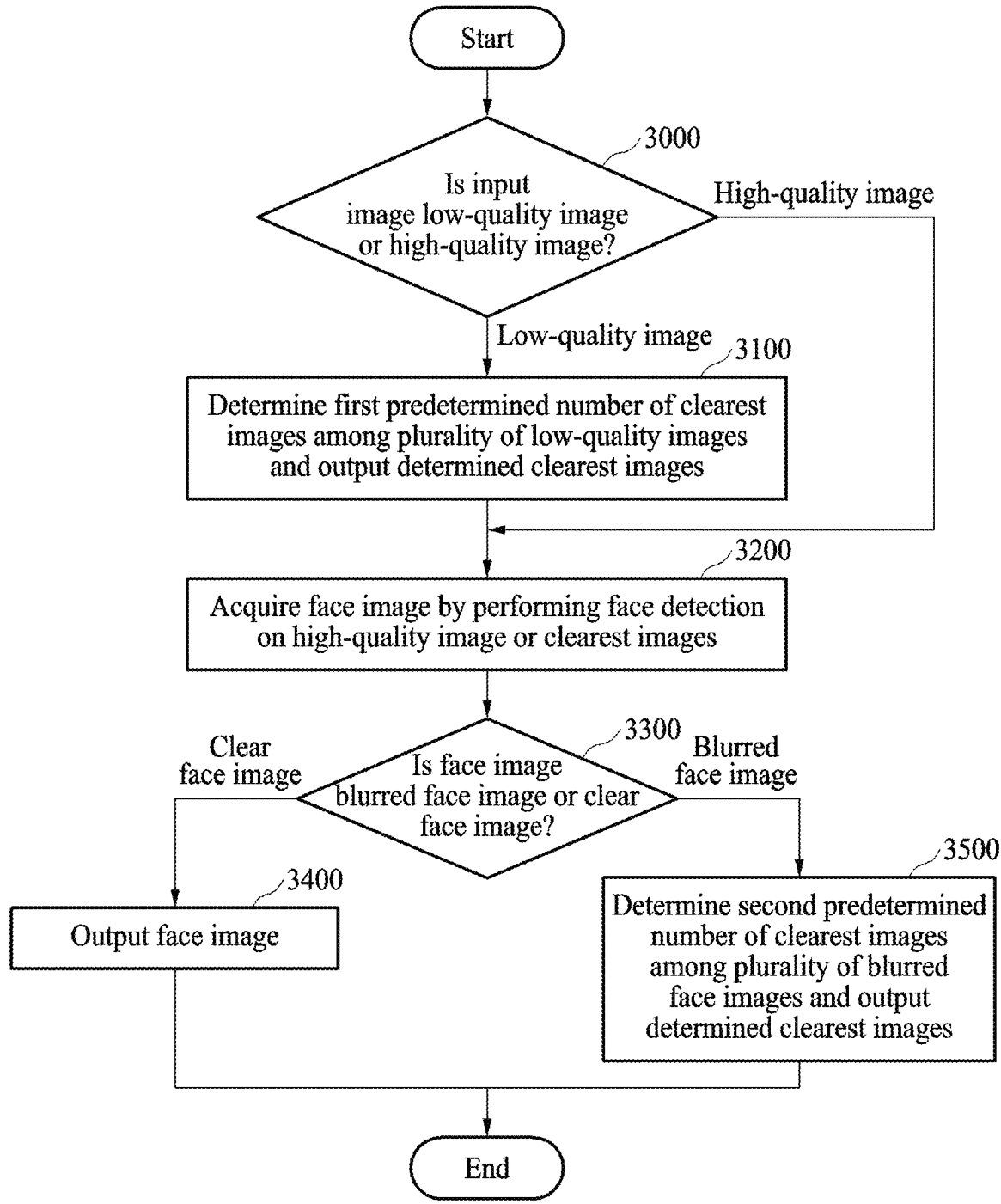

IMAGE PROCESSING METHOD AND APPARATUS

CROSS-REFERENCE TO RELATED APPLICATIONS

This application claims the benefit under 35 USC § 119(a) of Chinese Patent Application No. 201611204669.8 filed on Dec. 23, 2016 in the State Intellectual Property Office of the People's Republic of China and Korean Patent Application No. 10-2017-0098513 filed on Aug. 3, 2017 in the Korean Intellectual Property Office, the entire disclosures of which are incorporated herein by reference for all purposes.

BACKGROUND

1. Field

The following description relates to method and apparatus for processing a face image.

2. Description of Related Art

Under uncontrolled conditions such as light, camera shaking, and a moving subject, a large number of low-quality images, for example, a high backlit image, a dark image, and a blurred image, may be captured. An existing face detection method using a high-quality image may provide a low recognition rate with respect to a low-quality face image.

In the existing face detection method, a satisfactory detection effect may be obtained by using a training test database generated based on high-quality images under similar light amount conditions. However, when a difference between face areas in images having motion artifacts or low-quality images with a relatively large difference from an illumination condition of a database image increases, the face detection effectiveness may significantly decrease. When using the existing face detection method, the face detection rate may be relatively low for a low-quality image and a blurred image acquired at a low-light level. Therefore, systems may not be able to effectively recognize a person.

The existing face detection method may erroneously detect a background of an image as a face and may not detect a face in a backlight image. Also, the existing face detection method may be difficult to detect a face in a low-light image or a blurred image.

The existing face detection method may, generally, attempt to increase the face detection rate by eliminating or reducing interferences occurring in an image due to an external condition such as illumination through preprocessing. However, the existing face detection method may be required to perform the preprocessing on different types of low-quality images and determine an input image using a predetermined detection method. In such face detection method, it is difficult to determine or preprocess a plurality of types of images simultaneously.

Accordingly, there is a desire for an image processing method and apparatus for processing various types of low-quality images including a blurred image and a low-light image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing apparatus includes an image classifier configured to determine whether an input image is a low-quality image or a high-quality image, and an image evaluator configured to determine a first predetermined number of clearest images from a plurality of low-quality images determined by the image classifier.

The image classifier may be configured to calculate an image classification probability value used to classify the input image as a type among a plurality of different quality types using a first convolutional neural network (CNN) classifier model, and determine whether the input image is the low-quality image or the high-quality image based on the image classification probability value of the input image.

The image evaluator may be configured to calculate an image clearness with respect to each of the plurality of low-quality images and determine a first predetermined number of low-quality images among the plurality of low-quality images in an order from a highest clearness, to be the first predetermined number of clearest images.

The image processing apparatus may further include a face detector configured to perform a face detection on a clearest image determined by the image evaluator and a high-quality image determined by the image classifier using a second CNN classifier model and output a result image, wherein the result image may be a face image or an image in which a face is absent.

The image processing apparatus may further include a face image classifier configured to determine whether a face image output by the face detector is a blurred face image, and a face image evaluator configured to determine a second predetermined number of clearest face images among a plurality of blurred face images determined by the face image classifier.

The face image classifier may be configured to calculate a face image classification probability value used to classify the face image as a clear face image or the blurred face image using a third CNN classifier model, and determine whether the face image is the clear face image or the blurred face image based on the face image classification probability value.

The face image evaluator may be configured to calculate a face clearness with respect to each of the plurality of blurred face images, and determine a second predetermined number of blurred face images among the plurality of blurred face images in an order from a highest face clearness, to be the second predetermined number of clearest images.

In another general aspect, an image processing apparatus includes a face image classifier configured to determine whether a face image is a blurred face image, and a face image evaluator configured to determine a second predetermined number of clearest face images among a plurality of blurred face images determined by the face image classifier.

The face image classifier may be configured to calculate a face image classification probability value used to classify the face image as one of a clear face image and the blurred face image using a CNN classifier model, and determine whether the face image is the clear face image or the blurred face image based on the face image classification probability value of the face image.

In still another general aspect, an image processing method includes determining whether an input image is a low-quality image or a high-quality image, and determining a first predetermined number of clearest images from a plurality of determined low-quality images.

The determining whether the input image is the low-quality image or the high-quality image may include calculating an image classification probability value used to classify the input image as a type among a plurality of different quality types using a first CNN classifier model, and determining whether the input image is the low-quality image or the high-quality image based on the image classification probability value of the input image.

The determining of the first predetermined number of clearest images may include calculating an image clearness with respect to each of the plurality of low-quality images, and determining a first predetermined number of low-quality images among the plurality of low-quality images in an order from a highest clearness, to be the first predetermined number of clearest images.

The image processing method may further include performing a face detection on a clearest image determined by the image evaluator and a high-quality image determined by the image classifier using a second CNN classifier model and outputting a result image, wherein the result image may be a face image or an image in which a face is absent.

The image processing method may further include determining whether the face image is a blurred face image, and determining a second predetermined number of clearest face images among a plurality of determined blurred face images.

The determining of whether the face image is the blurred face image may include calculating a face image classification probability value used to classify the face image as a clear face image or the blurred face image using a third CNN classifier model, and determining whether the face image is the clear face image or the blurred face image based on the face image classification probability value.

The determining of the second predetermined number of clearest face images may include calculating a face clearness with respect to each of the plurality of blurred face images, and determining a second predetermined number of blurred face images among the plurality of blurred face images in an order from a highest face clearness, to be the second predetermined number of clearest images.

The input image may be captured by a camera operably coupled to the processor.

A non-transitory computer readable storage medium may store instructions that, when actuated by a processor, cause the processor to perform the above methods.

In another general aspect, an image processing method, includes actuating a camera to capture input images; actuating a processor to selectively generate a subset of candidate images from the input images according to image quality; and to adaptively allocate processing resources to identify face images amongst the selectively generated subset of candidate images.

The processor may include a convolutional neural network (CNN).

Other features and aspects will be apparent from the following detailed description, the drawings, and the claims.

BRIEF DESCRIPTION OF THE DRAWINGS

FIG. 11 illustrates an example of an image processing method.

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1A:
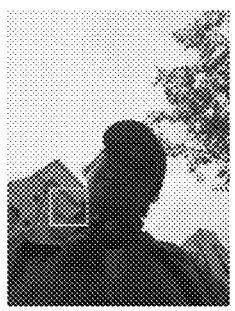
FIGS. 1A and 1B illustrate results of backlight image detection performed using a face detection method of a related art.
Figure 1B:
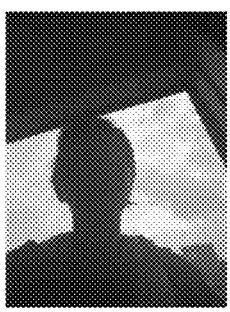
Figure 2A:
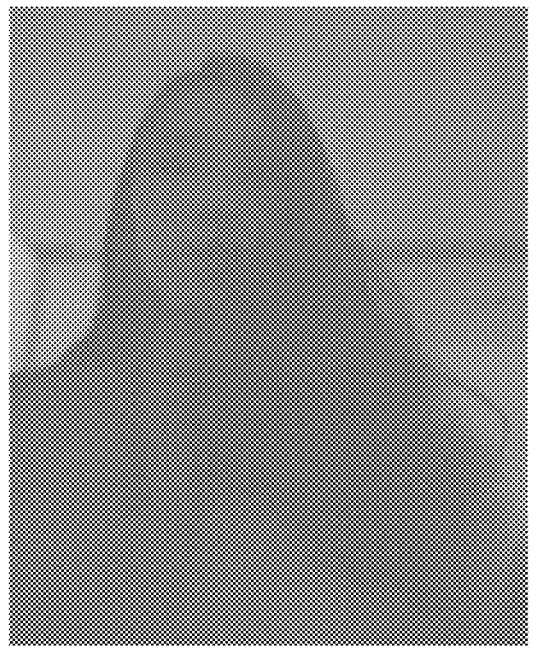
FIGS. 2A and 2B illustrate results of low-light image detection performed using a face detection method of a related art.
Figure 2B:
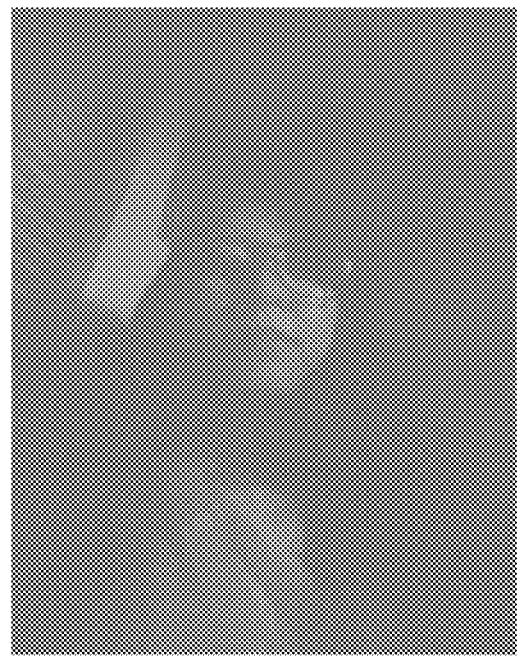
Figure 3A:
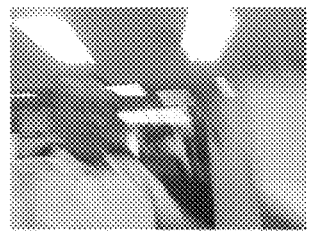
FIGS. 3A and 3B illustrate results of blurred image detection performed using a face detection method of a related art.
Figure 3B:
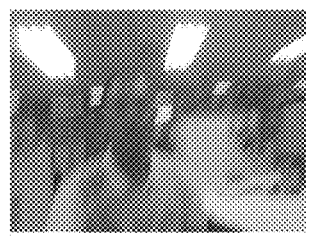

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIGS. 1A through 3B illustrate results of face detection performed on a backlight image and a low-light image using a face detection method of a related art.

Figure 4:
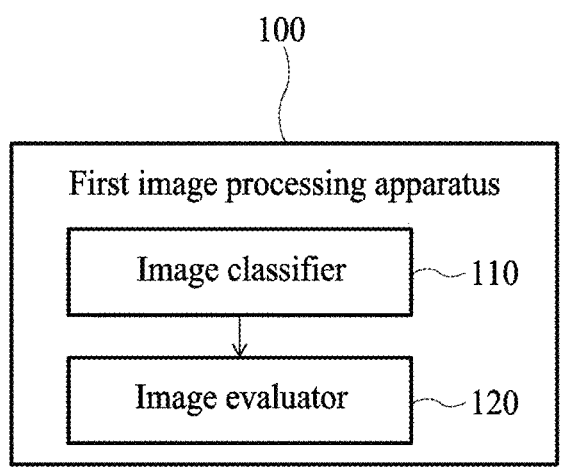
FIG. 4 illustrates an example of a first image processing apparatus.

FIG. 4 is a block diagram illustrating an example of a first image processing apparatus.

A first image processing apparatus 100 preprocesses may actuate an infrared, ultraviolet, or visible spectrum imaging apparatus such as a camera, lidar, millimeter wave radar, forward looking infrared (FLIR) or other suitable image capture device to provide an input image used for face detection. Referring to FIG. 4, the first image processing apparatus 100 includes an image classifier 110 and an image evaluator 120.

The image classifier 110 determines or verifies whether an input image is a low-quality image or a high-quality image. The image classifier 110 calculates an image classification probability value of the input image to be classified as a type among a plurality of different quality types using a first convolutional neural network (CNN) classifier model, and determines whether the input image is a low-quality image or a high-quality image based on the image classification probability value. The first CNN classifier model is, for example, a CNN low-quality image classifier model, and the image classifier 110 uses the CNN low-quality image classifier model to determine whether the input image is a low-quality image based on the image classification probability value. Also, when the image classifier 110 determines that the input image is the low-quality image, the image classifier 110 calculates an image clearness by transmitting the image classification probability value calculated using the CNN low-quality image classifier model to the image evaluator 120.

Figure 5:
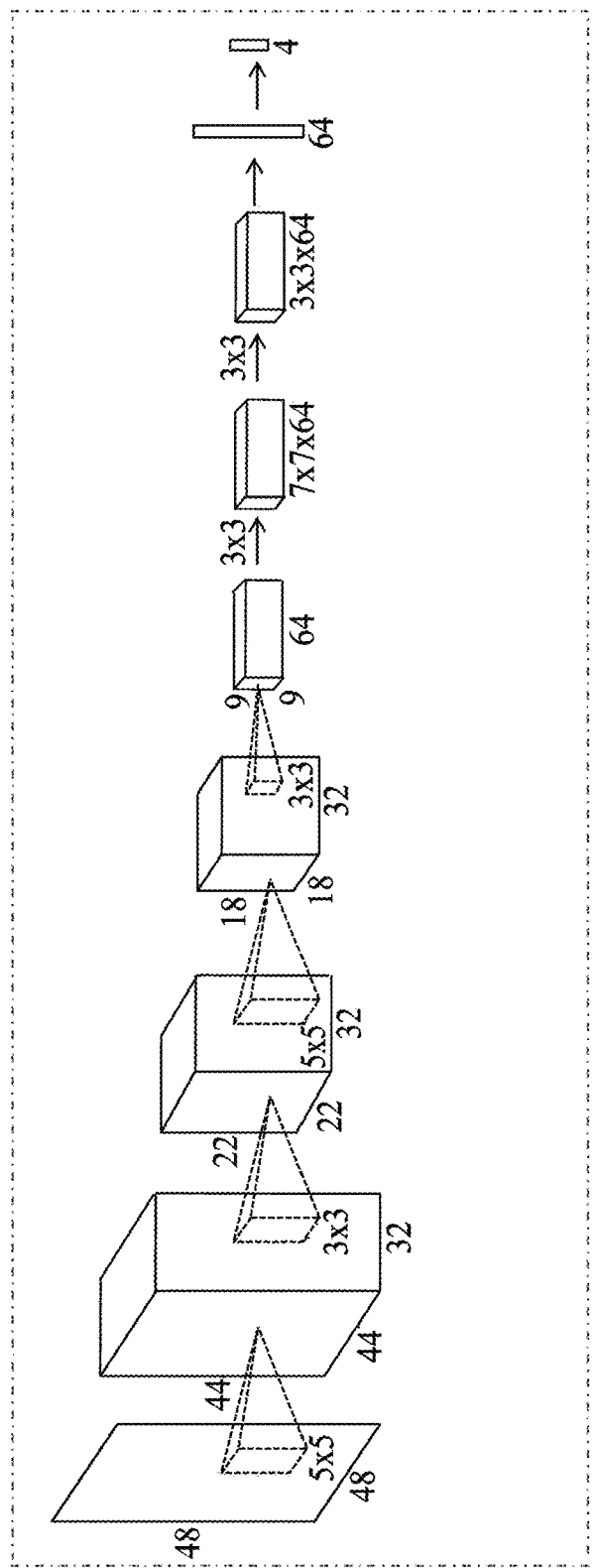
FIG. 5 illustrates an example of 4-classification convolutional neural network (CNN) image classifier model.

A CNN of the CNN low-quality image classifier model may use a plurality of network structures. As illustrated in FIG. 5, the CNN low-quality image classifier model includes an input layer, seven hidden layers, and an output layer in an order from left to right. The seven hidden layers include a first convolutional layer or a first filter layer, a first pooling layer, a second convolutional layer, a second pooling layer, a third convolutional layer, a third pooling layer, and a full-connected layer in the order from the left to the right. A 4-classification CNN low-quality image classifier model acquires a training parameter through a training on parameters of all convolutional layers, pooling layers, and full-connected layers using a low-quality image database.

In FIG. 5, a first diagonal, for example, a rectangle from the left represents an input layer. "48" on a side of and below the rectangle indicates a number of pixels. The number of pixels indicates that the input layer is a matrix including 48×48 neurons. The matrix may be a pixel point matrix including 48×48 pixel points of the input image.

A second diagonal from the left is a rectangular parallelepiped with a length corresponding to 44 pixel points, a height corresponding to 44 pixel points, and a width corresponding to 32 pixel points. The rectangular parallelepiped represents 32 feature maps having, as a first convolution result, a result obtained through a convolution after the input image passes through the first convolutional layer. Each of the feature map includes 44×44 pixel points.

A third diagonal from the left is a rectangular parallelepiped shape with a length corresponding to 22 pixel points, a height corresponding to 22 pixel points, and a width corresponding to 32 pixel points. The rectangular parallelepiped represents 32 feature maps having, as a first pooling result, a result obtained when the 32 feature maps corresponding to the first convolutional result passes through the first pooling layer. Each of the feature maps includes 22×22 pixel points.

A convolution process of the second convolutional layer and the third convolutional layer may be similar to a convolution process of the first convolutional layer, and a pooling process of the second pooling layer and the third pooling layer may be similar to a pooling process of the first pooling layer.

An eighth diagonal, for example, a rectangle from the left represents a full-connected layer. "64", the number of pixels below the full-connected layer indicates that the full-connected layer includes 64 neurons.

A ninth diagonal from the left, that is, a first diagonal from the right is a rectangle that represents an output layer. "4", the number of pixels below the output layer indicates that the output layer includes four neurons. Each of the neurons of the full-connected layer may be independently connected to each of the neurons of the third pooling layer. Each of the neurons of the output layer may be independently connected to each of the neurons of the full-connected layer.

In one example, when the CNN low-quality image classifier model is the 4-classification CNN low-quality image classifier model, the input image is classified as four different quality types, for example, a backlight image type, a low-light image type, a blurred image type, and a clear image type using the 4-classification CNN low-quality image classifier model. The image classifier 110 determines that the input image is a high-quality image when an image classification probability value of the input image to be classified as the clear image type is greater than an image classification probability value of the input image to be classified as the backlight image type, the low-light image type, or the blurred image type.

When the image classification probability value of the input image to be classified as at least one of the backlight image type, the low-light image type, and the blurred image type is greater than the image classification probability value of the input image to be classified as the clear image type, the image classifier 110 determines that the input image is a low-quality image. The image classification probability value may be stored in the image evaluator 120 in advance.

The image classifier 110 may be used to determine a first predetermined number of clearest images among the plurality of low-quality images. The image evaluator 120 calculates an image clearness of each of the plurality of low-quality images. Also, the image evaluator 120 determines a first predetermined number of low-quality images among the plurality of low-quality images in an order from a highest clearness, to be the first predetermined number of clearest images. The first predetermined number may be at least one and may be less than or equal to the number of the plurality of low-quality images.

When the image classifier 110 determines that the input image is the low-quality image, the image evaluator 120 receives the image classification probability value of the input image from the image classifier 110. Also, the image evaluator 120 calculates an inverse number of a standard deviation of the image classification probability value and sets the inverse number to be the image clearness of the input image, or sets, to be the image clearness of the input image, the image classification probability value of the input image to be classified as a clear image type.

For example, the CNN low-quality classifier model is the 4-classification the CNN low-quality image classifier model and an input image is determined as a low-quality image. In this example, the image evaluator 120 receives, from the image classifier 110, image classification probability values of the input image to be classified as, for example. four different quality types, such as, a backlight image type, a low-light image type, a blurred image type, and a clear image type. The image evaluator 120 calculates an inverse number of a standard deviation of the four image classification probability values and sets the inverse number to be an image clearness of the input image, or sets, to be the image clearness of the input image, the image classification probability value of the input image to be classified as the clear image type.

For example, the image classification probability value of the input image to be classified as the backlight image type is $x_1$, the image classification probability value of the input image to be classified as the low-light image type is $x_2$, the image classification probability value of the input image to be classified as the blurred image type is $x_3$, and the image classification probability value of the input image to be classified as the clear image type is $x_4$. In this example, a mean value of the four image classification probability values is $\mu$, and a standard deviation of the four image classification probability values is $$s = \sqrt{\frac{1}{4}\sum_{i=1}^{4}(x_1 - \mu)^2}.$$

The image evaluator 120 sets an inverse number of the standard deviation to be the image clearness of the input image. Also, the image evaluator 120 sets the image classification probability value $x_4$ to be the image clearness of the input image.

The image evaluator 120 stores the input image corresponding to the low-quality image and the calculated image clearness of the input image. When the image evaluator 120 stores a predetermined number of low-quality images, the image evaluator 120 determines a first predetermined number of low-quality images among the predetermined number of low-quality images in an order from a highest clearness, to be the first predetermined number of clearest images. The predetermined number is greater than equal to the first predetermined number.

For example, when ten low-quality images are stored, the image evaluator 120 determines three low-quality images among the ten low-quality images in the descending order from a highest clearness, to be the three clearest images.

As described above, when detecting a face in a low-quality image, a misdetection rate and an undetection rate may be reduced by processing an input image using the first image processing apparatus 100.

Figure 6:
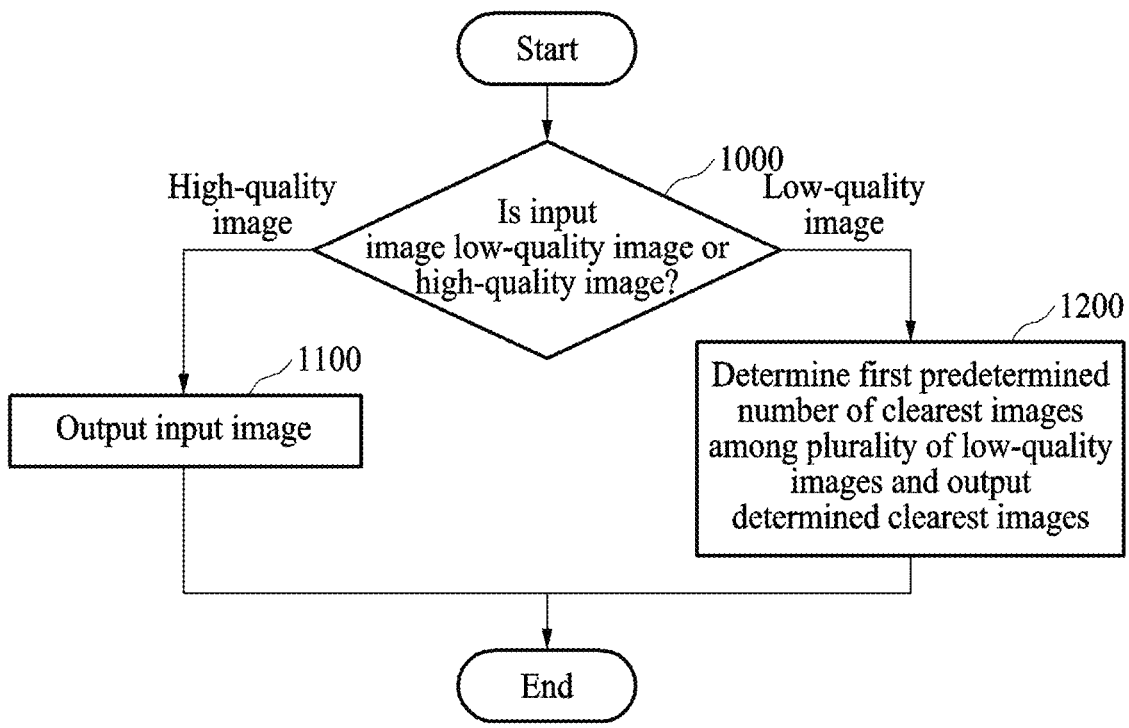
FIG. 6 illustrates an example of an image processing method.

FIG. 6 is a flowchart illustrating an example of an image processing method.

In operation 1000, the image classifier 110 determines whether an input image is a low-quality image or a high-quality image.

The image classifier 110 calculates an image classification probability value of the input image to be classified as a type among a plurality of different quality types using the first CNN classifier model, and determines whether the input image is the low-quality image or the high-quality image based on the image classification probability value.

For example, the first CNN classifier model is a CNN low-quality image classifier model. The image classifier 110 classifies the input image using the CNN low-quality image classifier model, and determines whether the input image is the low-quality image or the high-quality image based on the image classification probability value. Also, when the input image is determined to be the low-quality image, the image classifier 110 uses the image classification probability value calculated using the CNN low-quality image classifier model to calculate an image clearness of the input image.

When the CNN low-quality image classifier model is a 4-classification CNN low-quality image classifier model, the input image is classified as four different quality image types, for example, a backlight image type, a low-light image type, a blurred image type, and a clear image type using the 4-classification CNN low-quality image classifier model. The image classifier 110 determines that the input image is the high-quality image when the image classification probability value calculated using the 4-classification CNN low-quality image classifier model is greater than an image classification probability value of the input image to be classified as one of the backlight image type, the low-light image type, the blurred image type, and the clear image type.

When an image classification probability value of the input image to be classified as at least one of the backlight image type, the low-light image type, and the blurred image type is greater than an image classification probability value of the input image to be classified as the clear image type, the image classifier 110 determines that the input image is the low-quality image. The low-quality image and the image classification probability value of the low-quality image to be classified as each of the four different quality image types are used by the image classifier 110 to determine a clearness of the low-quality image.

In operation 1100, the image classifier 110 outputs the input image when the input image is determined to be the high-quality image.

In operation 1200, the image classifier 110 determines a first predetermined number of clearest images among a plurality of images determined as low-quality images and outputs the determined clearest images.

The image classifier 110 calculates an image clearness of each of the low-quality images, aligns the low-quality images in a descending order or an ascending order based on the image clearness, and determines, among the low-quality images, the first predetermined number of low-quality images corresponding to a high clearness in an order from a highest clearness, to be the first predetermined number of clearest images.

The image evaluator 120 sets an inverse number of a standard deviation of the image classification probability value of each of the low-quality images to be an image clearness of each of the low-quality images, or sets the image classification probability value of each of the low-quality images to be classified as the clear image type among the plurality of different quality types, to be the image clearness of each of the low-quality images. When the input image is determined to be the low-quality image, the image evaluator 120 calculates an inverse number of a standard deviation of the image classification probability value of the input image, that is, the low-quality image using the image classification probability value of the input image to be classified as a quality type and sets the inverse number to be an image clearness of the input image, or sets the image classification probability value of the input image to be classified as the clear image type among the plurality of different quality types, to be the image clearness of the input image.

For example, the CNN low-quality classifier model is the 4-classification the CNN low-quality image classifier model and the input image is determined to be a low-quality image. In this example, the image classifier 110 sets, to be the image clearness of the input image, an inverse number of a standard deviation of image classification probability values of the input image to be classified as four different quality types, for example, a backlight image type, a low-light image type, a blurred image type, and a clear image type or sets a probability value of the input image to be classified as the clear image type to be the image clearness of the input image, and stores the input image, that is, the low-quality image and the calculated image clearness of the input image. When a predetermined number of low-quality images are stored, the image classifier 110 determines a first predetermined number of low-quality images among the predetermined number of low-quality images in an order from a highest clearness, to be the first predetermined number of clearest images.

Figure 7:
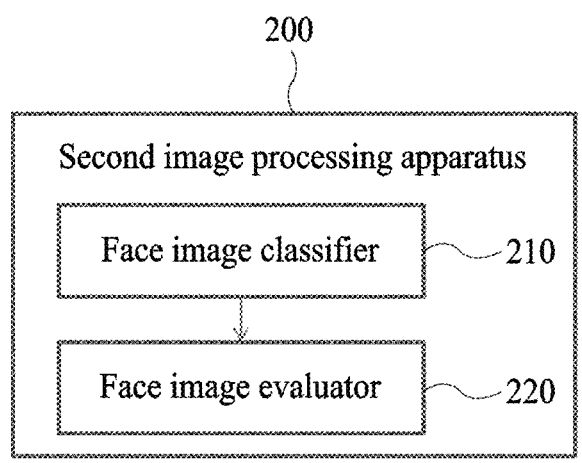
FIG. 7 illustrates an example of a second image processing apparatus.

FIG. 7 is a block diagram illustrating an example of a second image processing apparatus based on an image quality assessment (IQA).

A second image processing apparatus 200 is used for preprocessing an input image on which face detection is performed. The input image may be an image including a face output when a face detection apparatus performs the face detection on an image to be detected. The input image is also referred to as, for example, a face image. The face detection apparatus acquires a result image by performing the face detection on the image to be detected. The result image may be an image generated in an area including a face in the image to be detected during the face detection, an image obtained by positioning a face in the image from which the face is to be detected, or an image in which the face is not detected. The generated image and the positioning image may each be referred to as the face image. The image in which the face is not detected may be referred to as a face undetected image.

As illustrated in FIG. 7, the second image processing apparatus 700 includes a face image classifier 210 and a face image evaluator 220.

The face image classifier 210 is used to determine whether the face image is a blurred face image. The face image classifier 210 calculates a face image classification probability value of the face image to be classified as one of a clear face image type and a blurred face image type using a second CNN classifier model, and determines whether the face image is a clear face image or the blurred face image based on the face image classification probability value.

For example, the second CNN classifier model is a CNN blurred face image classifier model. The face image classifier 210 classifies the face image using the CNN blurred face image classifier model, and determines whether the face image is the blurred face image based on the face image classification probability value. Also, when the face image is determined to be the blurred face image, the face image classifier 210 transmits, to the face image evaluator 220, the face image classification probability value of the face image to be classified as one of the clear face image type and the blurred face image type, the value which is calculated using the CNN blurred face image classifier model.

The CNN blurred face image classifier model may use a plurality of networks structures.

Figure 8:
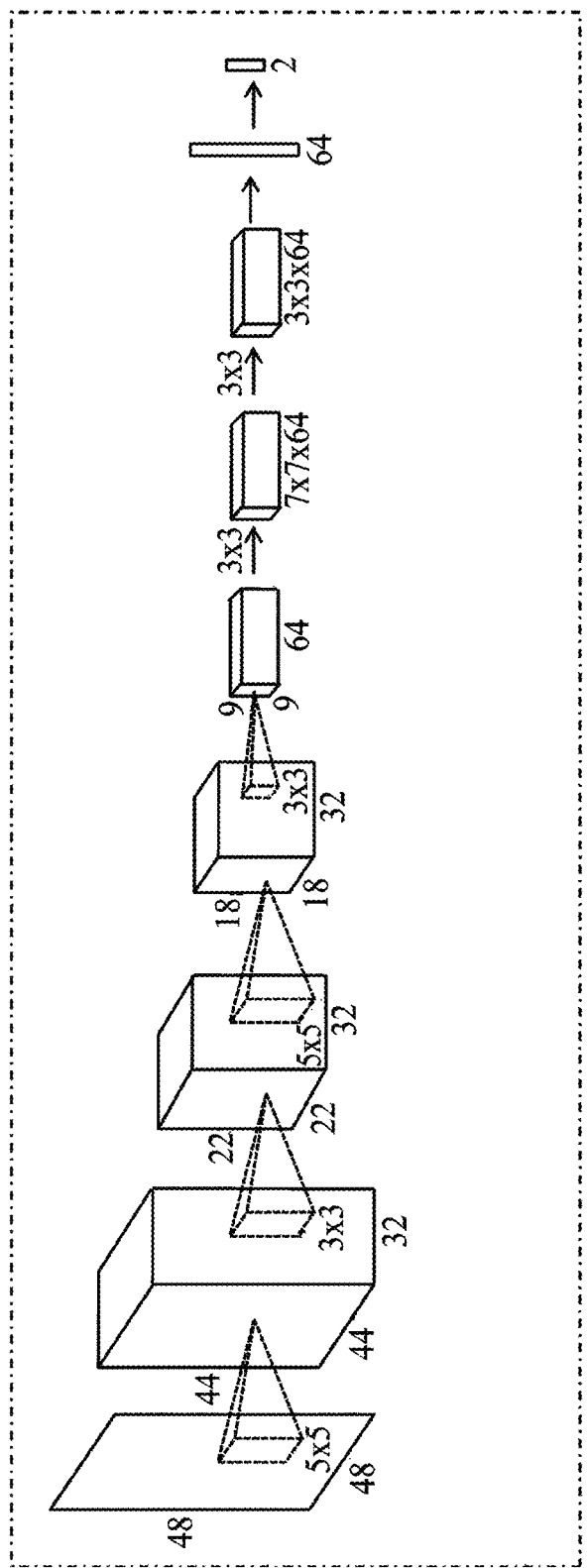
FIG. 8 illustrates an example of a 2-classification CNN blurred face image classifier model.

As illustrated in FIG. 8, the CNN blurred face image classifier model includes an input layer, seven hidden layers, and an output layers in an order from left to right. The seven hidden layers include a first convolutional layer or a first filter layer, a first pooling layer, a second convolutional layer, a second pooling layer, a third convolutional layer, a third pooling layer, and a full-connected layer in the order from the left to the right. A 2-classification CNN blurred face image classifier model acquires a training parameter through a training on parameters of all convolutional layers, pooling layers, and full-connected layers using a blurred face image database.

In FIG. 8, a first diagonal, for example, a rectangle from the left represents an input layer. "48" on a side of and below the rectangle indicates a number of pixels. The number of pixels indicates that the input layer is a matrix including 48×48 neurons. The matrix may be a pixel point matrix including 48×48 pixel points of the input image.

A second diagonal from the left is a rectangular parallelepiped shape with a length corresponding to 44 pixel points, a height corresponding to 44 pixel points, and a width corresponding to 32 pixel points. The rectangular parallelepiped shape represents 32 feature maps having, as a first convolution result, a result obtained through a convolution after the input image passes through the first convolutional layer. Each of the feature maps, in an embodiment includes 44×44 pixel points.

A third diagonal from the left is a rectangular parallelepiped shape with a length corresponding to 22 pixel points, a height corresponding to 22 pixel points, and a width corresponding to 32 pixel points. The rectangular parallelepiped shape represents 32 feature maps having, as a first pooling result, a result obtained when the 32 feature maps corresponding to the first convolutional result passes through the first pooling layer. Each of the 32 feature maps having the first pooling result includes 22×22 pixel points.

A convolution process of the second convolutional layer and the third convolutional layer may be similar to a convolution process of the first convolutional layer, and a pooling process of the second pooling layer and the third pooling layer may be similar to a pooling process of the first pooling layer. Thus, repeated description will be omitted.

An eighth diagonal, for example, a rectangle from the left represents a full-connected layer. "64" below the full-connected layer indicates that the full-connected layer includes 64 neurons.

A ninth diagonal from the left, that is, a first diagonal from the right is a rectangle that represents an output layer. "2" below the output layer indicates that the output layer includes two neurons. Each of the neurons of the full-connected layer may be independently connected to each of the neurons of the third pooling layer. Each of the neurons of the output layer may be independently connected to each of the neurons of the full-connected layer.

In one example, when the CNN low-quality image classifier model is a 2-classification CNN blurred face image classifier model, the face image is classified as two image types, the clear face image type and the blurred face image type using the 2-classification CNN blurred face image classifier model. When the face image classification probability value of the face image to be classified as the clear face image type is greater than the face image classification probability value of the face image to be classified as the blurred image type, the face image classifier 210 determines that the face image is not a blurred face image.

In another example, when the face image classification probability value of the face image to be classified as the blurred image type is less than the face image classification probability value of the face image to be classified as the clear face image type, the face image classifier 210 determines that the face image is the blurred face image, and transmits the image classification probability value of the face image to be classified as one of the clear face image type and the blurred face image type to the face image evaluator 220 such that an image clearness is used for calculation.

The face image evaluator 220 may be used to determine a second predetermined number of clearest images among the plurality of blurred face images determined by the face image classifier 210. The face image evaluator 220 calculates an image clearness of each of the plurality of blurred face images. Also, the face image evaluator 220 determines a second predetermined number of blurred face images among the plurality of blurred face images in an order from a highest clearness, to be the second predetermined number of clearest face images. The second predetermined number of clearest face images are input to a face detection apparatus in order to be used when the face detection is performed. The second predetermined number may be at least one and may be less than or equal to the number of plurality of blurred face images.

When the face image classifier 210 determines that the face image is the blurred face image, the face image evaluator 220 receives the image classification probability value of the face image from the face image classifier 210. Also, the face image evaluator 220 calculates an inverse number of a standard deviation of two image classification probability values of the face image and sets the inverse number to be the image clearness of the face image, or sets, to be the image clearness of the face image, the image classification probability value of the face image to be classified as the clear face image type. The face image evaluator 220 stores the face image corresponding to the blurred face image and the calculated image clearness of the face image. When a predetermined number of blurred face images are stored, the face image evaluator 220 determines the second predetermined number of blurred face images among the predetermined number of blurred face images in an order from a highest clearness, to be the second predetermined number of clearest face images. The second predetermined number of clearest face images may be used when a face identification apparatus performs the face detection.

Figure 9:
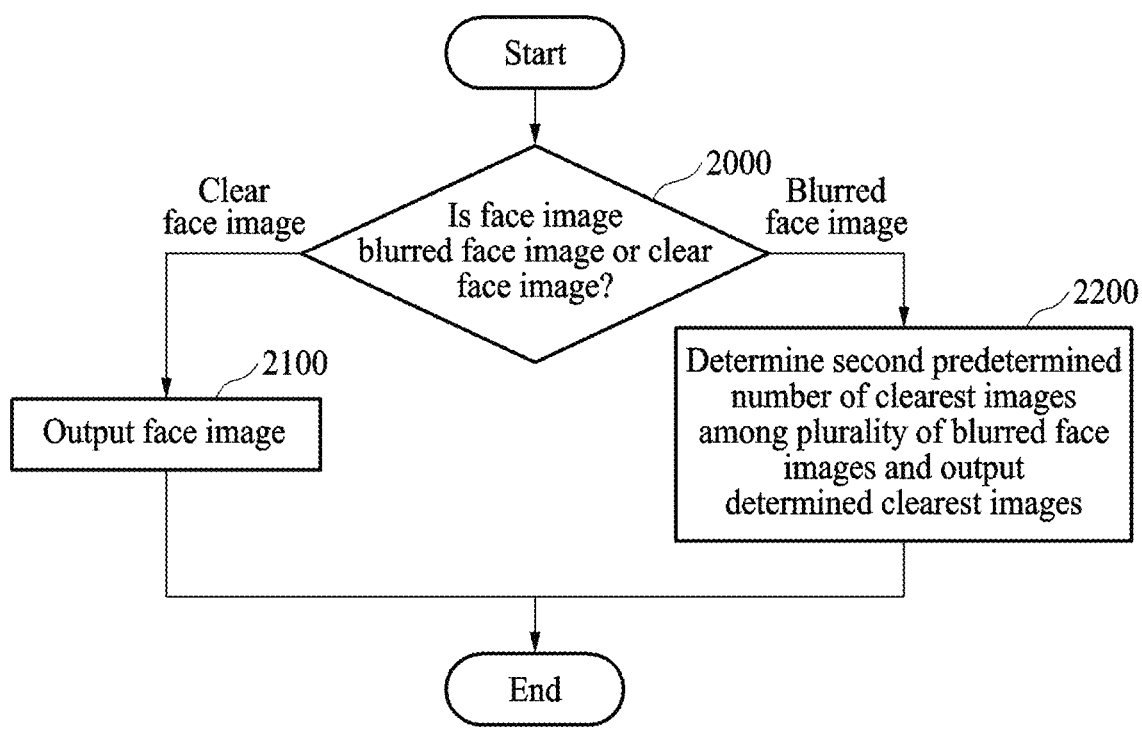
FIG. 9 illustrates an example of an image processing method.

FIG. 9 is a flowchart illustrating an example of an image processing method performed by a second image processing apparatus.

In operation 2000, the face image classifier 210 determines whether an input image, for example, a face image is a blurred face image or a clear face image.

The input image is, for example, an image output when a face detection apparatus performs a face detection on an image. The face detection apparatus acquires a result image by performing the face detection on the image. The result image may be an image generated in an area including a face in an image to be detected when the face detection apparatus performs the face detection, an image obtained by positioning a face in the image from which the face is to be detected, or an image in which the face is not detected. The generated image and the positioning image may each be referred to as the face image. The image in which the face is not detected may also be referred to as a face undetected image.

The face image classifier 210 calculates a face image classification probability value of the face image to be classified as one of a clear face image type and a blurred face image type using a second CNN classifier model, and determines whether the face image is a clear face image or the blurred face image based on the face image classification probability value.

In one example, the second CNN classifier model is a CNN blurred face image classifier model. The face image classifier 210 performs classification and identification on the face image using the CNN blurred face image classifier model, and determines whether the face image is the blurred face image based on the image classification probability value. Also, when the face image is determined to be the blurred face image, the image classification probability value of the face image to be classified as one of the clear face image type and the blurred face image type, the value which is calculated using the CNN blurred face image classifier model, is used to calculate an image clearness.

When the CNN low-quality classifier model is 2-classification CNN blurred face image classifier model, the face image classifier 210 classifies the input image as one of the clear face image type and the blurred face image type using the 2-classification CNN blurred face image classifier model. When a face image classification probability value of the face image to be classified as the clear face image type is greater than a face image classification probability value of the face image to be classified as the blurred face image type, the face image classifier 210 determines that the face image is a clear face image. The clear face image is input to a face identification apparatus and used for the face detection to e.g. provide access to a system, to train a face identification apparatus, or to modify the user interface according to the identity or emotion of the user, etc.

In another example, the face image classification probability value of the face image to be classified as the blurred face image type is greater than or equal to the face image classification probability value of the face image to be classified as the clear face image type, the face image classifier 210 determines that the face image is a blurred face image. The face image classification probability value of the face image, for example, the blurred face image to be classified as one of the clear face image type and the blurred face image type is used to determine an image clearness of the face image.

In operation 2100, when the face image is determined to be the clear face image, the face image classifier 210 outputs the face image.

In operation 2200, the face image evaluator 220 determines a second predetermined number of clearest face images among a plurality of blurred face images and outputs the determined clearest face images.

The face image evaluator 220 calculates an image clearness of each of the blurred face images and determines, among the blurred face images, the second predetermined number of blurred face images corresponding to a high clearness in an order from a highest clearness, to be the second predetermined number of clearest face images. The second predetermined number of clearest face images are used for the face detection.

When the face image evaluator 220 determines that the face image is the blurred face image, the face image evaluator 220 calculates an inverse number of a standard deviation of the two image classification probability values, for example, a probability value of the face image to be classified as the clear face image type and a probability value of the face image to be classified as the blurred face image and sets the inverse number to be an image clearness of the face image, or sets the face image classification probability value of the face image to be classified as the clear face image type to be the image clearness of the face image. The face image evaluator 220 stores the face image corresponding to the blurred face image and the calculated image clearness of the input image. When a predetermined number of blurred face images are stored, the face image evaluator 220 determines a second predetermined number of blurred face images among the plurality of blurred face images in an order from a highest clearness, to be the second predetermined number of clearest images. The second predetermined number of clearest images are used for the face detection.

Figure 10:
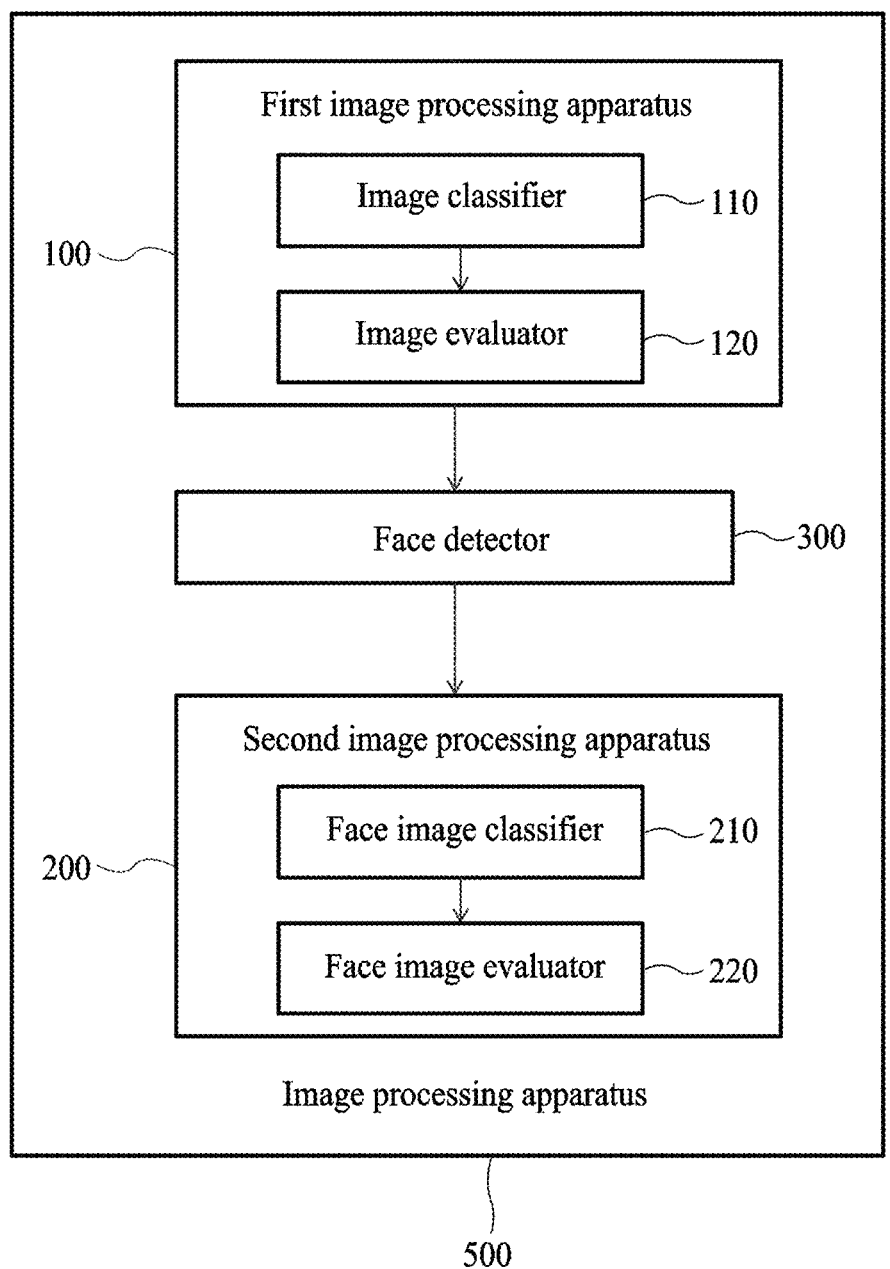
FIG. 10 illustrates an example of an image processing apparatus.

FIG. 10 is a block diagram illustrating an example of an image processing apparatus based on an image quality assessment (IQA).

Referring to FIG. 10, an image processing apparatus 500 includes the first image processing apparatus 100, a face detector 300, and the second image processing apparatus 200.

The first image processing apparatus 100 determines whether each of a plurality of input images is a low-quality image or a high-quality image, and determines a first predetermined number of clearest images from a plurality of low-quality images. Since the description of FIG. 4 is also applicable here, repeated description about a method of determining clearest images will be omitted for brevity and clarity.

The face detector 300 acquires a result image by performing a face detection on a clearest image and a high-quality image determined by the first image processing apparatus 100. The result image may be an image generated in an area including a face in the image to be detected when the face detector 300 performs the face detection, an image obtained by positioning a face in the image from which the face is to be detected, or an image in which the face is not detected. The generated image and the positioning image may each be referred to as the face image. The image in which the face is not detected may be referred to as a face undetected image. When the result image is the face image, the result image is input to the second image processing apparatus 200. When the result image is the face undetected image, the result image may not be input to the second image processing apparatus 200. The face detector 300 may perform the face detection using various face detection methods, for example, a Viola-Jones face detection method, a local binary patterns (LBP) face detection method, a multi-block LBP (MB-LBP) face detection method, and a CNN face detection method.

The face detector 300 performs the face detection using a CNN face detector based on a multi-level CNN face detection model. To reduce a storage space of a storing model and an amount of time for calculating a training parameter, at least two CNN models among a 2-classification CNN blurred face classifier model, a 4-classification CNN blurred face classifier model, and a first level CNN classifier model of the multi-level CNN face detection model share parameters of a predetermined number of convolutional layers and pooling layers. For example, the first level CNN classifier model of the multi-level CNN face detection model, the 2-classification CNN blurred face classifier model, and the 4-classification CNN blurred face classifier model share training parameters of a first convolutional layer, a second convolutional layer, a first pooling layer, and a second pooling layer. The 4-classification CNN blurred face classifier model acquires a training parameter through a training on parameters of a third convolutional layer, a third pooling layer, and a full-connected layer using a low-quality image database. The 2-classification CNN blurred face image classifier model acquires the training parameter through the training on parameters of the third convolutional layer, the third pooling layer, and the full-connected layer using a blurred face image database.

The second image processing apparatus 200 determines whether a face image output to the face detector 300 is a blurred face image and determines a second predetermined number of clearest face images from a plurality of blurred face images. A clear face image and a clearest face image are used for the face detection.

The image processing apparatus 500 further includes a face identifier (not shown). The face identifier is configured to perform a face identification using the clear face image and the clearest face image determined by the second image processing apparatus 200. Also, the face identifier performs the face identification using a plurality of face identification algorithms. The face identifier performs the face identification using a face identification algorithm based on a CNN model.

FIG. 11 is a flowchart illustrating an example of an image processing method.

In operation 3000, the image classifier 110 determines whether an input image is a low-quality image or a high-quality image. Operation 3000 may be performed similarly or identically to operation 1100 of FIG. 6.

As a determination result, when the input image is the low-quality image, the image classifier 110 determines a first predetermined number of clearest images from a plurality of low-quality images and transmits the first predetermined number of clearest images to the face detector 300 in operation 3100.

As a determination result, when the input image is the high-quality image, the image classifier 110 transmits the input image to the face detector 300.

In operation 3200, the face detector 300 acquires a face image by performing a face detection on the high-quality image or the clearest images.

The result image may be the face image or a face undetected image. When the result image is a face image, the face image classifier 210 performs a subsequent operation, for example, operation 3400. When the result image is a face undetected image, the result image may not be used. The face detector 300 may perform the face detection using various face detection methods, for example, a Viola-Jones face detection method, an LBP face detection method, an MB-LBP face detection method, and a CNN face detection method. The face detector 300 may also perform the face detection using a CNN face detection method based on a multi-level CNN model.

The result image may be the face image or the face undetected image. When a result image is the face image, the face image classifier 210 performs operation 3400. When a result image is the face undetected image, the result image may not be used.

In operation 3300, the face image evaluator 220 determines whether the detected face image is a blurred face image.

Operation 3400 may be performed similarly or identically to operation 2100 of FIG. 9.

In operation 3400, when the face image is determined to be a clear face image, the face image evaluator 220 outputs the clear face image.

In operation 3500, the image processing apparatus 500 determines the second predetermined clearest face images from a plurality of blurred face images.

Operation 3500 may be performed similarly or identically to operation 2200 of FIG. 9. The clear face image acquired in operation 3400 and the clearest face images acquired in operation 3500 are additionally used in a face identification process.

The image processing apparatus and method processes an image before face detection or face identification and thus, the face detection is more efficiently performed. Also, even when the face detection is performed on a low-quality image, misdetection and non-detection rates may be reduced and a face detection accuracy on a blurred face image may also increase.

The wireless communication apparatus and components thereof in FIGS. 1-11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, oscillators, signal generators, inductors, capacitors, buffers, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by either one or both of analog electrical components, mixed mode components, and computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions, firmware, design model, or software include machine code that is directly executed by the one or more processors or computers, such as machine code produced by a compiler. In another example, the instructions, firmware, analog logic, or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions, firmware, or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

Although specific terminology has been used in this disclosure, it will be apparent after an understanding of the disclosure of this application that different terminology may be used to describe the same features, and such different terminology may appear in other applications.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing apparatus, comprising:
a processor configured to
determine whether an input image is a low-quality image or a high-quality image;
determine a first number of clearest images from among a plurality of low-quality images being determined; and
perform a face detection on a determined clearest image and a determined high-quality image using a second convolutional neural network (CNN) classifier model, and output a result image resulting from the performing of the face detection,
wherein the result image is a face image or an image in which a face is absent.

2. The image processing apparatus of claim 1, wherein the processor is further configured to calculate an image classification probability value used to classify the input image as a type among a plurality of different quality types using a first CNN classifier model, and determine whether the input image is the low-quality image or the high-quality image based on the image classification probability value of the input image.

3. The image processing apparatus of claim 1, wherein the processor is further configured to calculate an image clearness with respect to each of the low-quality images and to determine a first number of low-quality images from among the low-quality images in an order from a highest clearness, to be the first number of clearest images.

4. The image processing apparatus of claim 1, the processor is further configured to:
determine whether a face image, of plural face images output by the face detector, is a blurred face image; and
determine a second predetermined number of clearest face images among a plurality of blurred face images being determined.

5. The image processing apparatus of claim 4, wherein the processor is configured to calculate a face image classification probability value used to classify the face image as a clear face image or the blurred face image using a third CNN classifier model, and determine whether the face image is the clear face image or the blurred face image based on the face image classification probability value.

6. The image processing apparatus of claim 4, wherein the processor is configured to calculate a face clearness with respect to each of the plurality of blurred face images, and determine a second predetermined number of blurred face images among the plurality of blurred face images in an order from a highest face clearness, to be the second predetermined number of clearest images.

7. The method of claim 1, wherein the processor is further configured to determine an image clearness with respect to each of the low-quality images based on an inverse of a standard deviation of the image classification probability value of the respective image.

8. An image processing apparatus comprising:
a processor configured to:
determine whether a face image is a blurred face image; and
determine a second predetermined number of clearest face images among a plurality of blurred face images being determined.

9. The image processing apparatus of claim 8, wherein the processor is configured to calculate a face image classification probability value used to classify the face image as one of a clear face image and the blurred face image using a convolutional neural network (CNN) classifier model, and determine whether the face image is the clear face image or the blurred face image based on the face image classification probability value of the face image.

10. An image processing method comprising:
actuating a processor to:
determine whether an input image is a low-quality image or a high-quality image;
determine a first number of clearest images from determined low-quality images; and
perform a face detection on a determined clearest image and a determined high-quality image using a first convolutional neural network (CNN) classifier model and outputting a result image resulting from the performing of the face detection,
wherein the result image is a face image or an image in which a face is absent.

11. The image processing method of claim 10, wherein the actuating of the processor to determine whether the input image is the low-quality image or the high-quality image comprises the actuating of the processor to:
calculate an image classification probability value to classify the input image as a type among a plurality of different quality types using a second convolutional neural network (CNN) classifier model; and
determine whether the input image is the low-quality image or the high-quality image based on the image classification probability value of the input image.

12. The image processing method of claim 11, wherein the input image is captured by a camera operably coupled to the processor.

13. The image processing method of claim 10, wherein the actuating of the processor to determine the first predetermined number of clearest images comprises the actuating of the processor to:
calculate an image clearness with respect to each of the low-quality images; and
determine a first number of low-quality images from among the low-quality images in an order from a highest clearness, to be the first predetermined number of clearest images.

14. The image processing method of claim 10, further comprising the actuating of the processor to:

determine whether the face image is a blurred face image; and determine a second predetermined number of clearest face images among a plurality of determined blurred face images.

15. The image processing method of claim 14, wherein the actuating of the processor to determine whether the face image is the blurred face image comprises the actuating of the processor to:

calculate a face image classification probability value used to classify the face image as a clear face image or the blurred face image using a third CNN classifier model; and determine whether the face image is the clear face image or the blurred face image based on the face image classification probability value.

16. The image processing method of claim 14, wherein the actuating of the processor to determine the second predetermined number of clearest face images comprises the actuating of the processor to:

calculate a face clearness with respect to each of the plurality of blurred face images; and determine a second predetermined number of blurred face images among the plurality of blurred face images in an order from a highest face clearness, to be the second predetermined number of clearest images.

17. A non-transitory computer readable storage medium storing instructions that, when actuated by a processor, cause the processor to perform the method of claim 10.

18. An image processing method, comprising:

actuating a camera to capture input images;

actuating a processor to:

selectively generate a subset of candidate images from the input images according to image quality;

adaptively allocate processing resources to identify face images amongst the selectively generated subset of candidate images, wherein the identifying face images includes performing a face detection on the selectively generated subset of candidate images using a first convolutional neural network (CNN) classifier model and outputting a result image resulting from the performing of the face detection, wherein the result image is a face image or an image in which a face is absent.

19. A non-transitory computer readable storage medium storing instructions, that when actuated by the processor, cause the processor to perform the method of claim 18.

20. The method of claim 18, wherein the processor comprises the first convolutional neural network (CNN), of plural CNNs.

* * * * *